US012110127B2

(12) United States Patent
Soulie

(10) Patent No.: US 12,110,127 B2
(45) Date of Patent: Oct. 8, 2024

(54) AIRCRAFT PROPULSION ASSEMBLY COMPRISING A PLATE HEAT EXCHANGER, OF HEXAGONAL LONGITUDINAL SECTION, POSITIONED IN A BIFURCATION

(71) Applicant: Airbus Operations (S.A.S.), Toulouse (FR)

(72) Inventor: Adeline Soulie, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 17/972,033

(22) Filed: Oct. 24, 2022

(65) Prior Publication Data

US 2023/0129735 A1    Apr. 27, 2023

(30) Foreign Application Priority Data

Oct. 25, 2021 (FR) ..................................... 2111290

(51) Int. Cl.
*B64D 33/08* (2006.01)
*B64D 29/02* (2006.01)
(Continued)

(52) U.S. Cl.
CPC ............. *B64D 33/08* (2013.01); *B64D 29/02* (2013.01); *B64D 33/04* (2013.01); *F28F 3/08* (2013.01)

(58) Field of Classification Search
CPC ......... F05D 2260/213; F05D 2220/323; F05D 2260/208; F05D 2220/32; F05D 2250/132; F02C 6/08; F02C 7/047; F02C 7/18; F02C 7/14; F02C 9/18; F02C 7/185; F02C 7/141; F02C 7/10; F02C 7/12; F02C 7/16; F02C 7/20; B64D 13/08; B64D 33/08;
(Continued)

(56) References Cited

U.S. PATENT DOCUMENTS 5,915,469 A   6/1999 Abramzon et al.
8,161,755 B2  4/2012 Marche
(Continued)

FOREIGN PATENT DOCUMENTS

CN    108801007 A  * 11/2018 ........... F28D 9/0025
CN    114894012 A  *  8/2022
(Continued)

OTHER PUBLICATIONS

French Search Report for Application No. 2111290 dated Jun. 10, 2022.

*Primary Examiner* — Craig Kim
(74) *Attorney, Agent, or Firm* — KDW Firm PLLC

(57) ABSTRACT

An aircraft propulsion assembly having an engine, a nacelle positioned around the engine, an annular duct delimited by the engine and the nacelle for a bypass flow of cold air, at least one bifurcation passing through the annular duct for connecting the engine and the nacelle and having a leading edge and a primary structure of a pylon housed in the bifurcation and configured to connect the engine to an aircraft wing. The propulsion assembly has at least one heat exchange device including a plate heat exchanger, having a hexagonal longitudinal section and positioned in the bifurcation. According to one configuration, the heat exchanger is a countercurrent heat exchanger.

12 Claims, 5 Drawing Sheets

(51) Int. Cl.
*B64D 33/04* (2006.01)
*F28F 3/08* (2006.01)

(58) Field of Classification Search
CPC .............. B64D 13/06; B64D 27/18; B64D 2033/0233; F01D 25/12; F28D 2021/0021; F28D 7/0066; F28F 3/08; F28F 1/06

See application file for complete search history.

(56) References Cited

U.S. PATENT DOCUMENTS

| | | | |
|---|---|---|---|
| 8,522,529 B2 | 9/2013 | Martinou et al. | |
| 10,253,691 B2* | 4/2019 | Afrianto | F02C 6/08 |
| 10,823,068 B2* | 11/2020 | Blumrich | F02C 7/18 |
| 11,408,337 B2 | 8/2022 | Geliot et al. | |
| 11,408,338 B2* | 8/2022 | Medda | B64D 13/08 |
| 2004/0031599 A1* | 2/2004 | Wilson | F28D 9/0068 |
| | | | 165/69 |
| 2017/0122213 A1* | 5/2017 | Bowden | F02K 3/06 |
| 2019/0186362 A1* | 6/2019 | Blumrich | F02C 7/12 |
| 2019/0226400 A1* | 7/2019 | Geliot | F02C 6/04 |
| 2019/0309683 A1* | 10/2019 | Mackin | F02C 7/047 |
| 2020/0347782 A1* | 11/2020 | Medda | B64D 15/04 |
| 2023/0129735 A1* | 4/2023 | Soulie | B64D 29/02 |
| | | | 244/57 |
| 2023/0203322 A1* | 6/2023 | Phillips | C08K 5/0058 |
| | | | 106/18.33 |
| 2023/0373635 A1* | 11/2023 | Murray | F02C 6/06 |

FOREIGN PATENT DOCUMENTS

| | | | | |
|---|---|---|---|---|
| EP | 3163054 A1 | * | 5/2017 | ............ F02C 6/08 |
| EP | 3533988 A1 | * | 9/2019 | ............ F02C 6/08 |
| EP | 3712404 A1 | * | 9/2020 | ............ F02C 7/14 |
| EP | 4170145 A1 | * | 4/2023 | ............ B64D 29/02 |
| FR | 2 889 250 A1 | | 2/2007 | |
| FR | 2 889 298 A1 | | 2/2007 | |
| FR | 3 077 060 A1 | | 7/2019 | |
| TW | 202335985 A | * | 9/2023 | |
| WO | WO-2022028653 A1 | * | 2/2022 | ............ B64D 27/18 |

* cited by examiner

AIRCRAFT PROPULSION ASSEMBLY COMPRISING A PLATE HEAT EXCHANGER, OF HEXAGONAL LONGITUDINAL SECTION, POSITIONED IN A BIFURCATION

TECHNICAL FIELD

The present application relates to an aircraft propulsion assembly having a plate heat exchanger, of hexagonal longitudinal section, positioned in a bifurcation, and to an aircraft comprising the aircraft propulsion assembly.

BACKGROUND

According to one configuration, an aircraft 10 comprises multiple propulsion assemblies 12 positioned beneath the wings 14.

As shown in FIGS. 1 and 2, a propulsion assembly 12 comprises:
- an engine 16 in which flows a core air flow,
- a nacelle 18 positioned around the engine 16 so as to delimit, with the latter, an annular duct 20 in which flows a bypass flow 22 of cold air, and
- a pylon 24 which provides the connection between the engine 16 and the wing 14.

The nacelle 18 comprises an outer wall 18.1 and an inner wall 18.2 delimiting the annular duct 20.

The engine 16 comprises, in the direction of flow of the core flow represented by the arrow 26, a fan casing 16.1 of large size delimiting an annular fan conduit, a central casing 16.2 of smaller size enclosing the "core" zone of the engine 16 through which the core flow passes, and an exhaust casing 16.3 of larger size via which the core flow is discharged.

The pylon 24 comprises a rigid primary structure 28 which, among other things, serves to transmit forces between the engine 16 and the rest of the aircraft 10, and a secondary structure 30 which encloses the primary structure 28 and reduces the drag of the pylon 24.

As shown in FIG. 2, each propulsion assembly 12 comprises at least one heat exchange device 32 configured to cool hot air which is taken from the compression stages of the engine 16 and is destined for the systems for air-conditioning and pressurization of the aircraft, and/or for de-icing of the wings 14.

According to a first embodiment, each heat exchange device 32 comprises:
- a heat exchanger 34, which has a parallelepipedal shape and has a first, hot air circuit, connecting a first inlet 36 positioned on a first face of the heat exchanger 34 to a first outlet 38 positioned on a second face parallel to the first face, and a second, cold air circuit connecting a second inlet 40 positioned on a third face, perpendicular to the first and second faces, to a second outlet 42 positioned on a fourth face parallel to the third face,
- a hot air supply duct 44 which is configured to take hot air from the engine 16, which passes through the primary structure 28 of the pylon and which is connected to the first inlet 36,
- a hot air outlet duct 46 connected to the first outlet 38,
- a cold air supply duct 48 connected to the second inlet 40, leading into the bypass flow 22 via a scoop 50 configured to take cold air from the bypass flow 22,
- an exhaust duct 52 connected to the second outlet 42, which leads out of the aircraft via a grille 54 provided in the secondary structure 30 of the pylon and configured to expel the air out of the aircraft.

According to this first embodiment, the heat exchanger 34 is positioned between the outer and inner walls 18.1, 18.2 of the nacelle 18 outside the annular duct 20.

Since aircraft engines have increasingly large diameters and are positioned as close as possible to the wings 14 to improve aerodynamic performance and retain a minimum ground clearance, the zone located above the primary structure 28 and below the secondary structure 30 of the pylon is more and more confined, this tending to make the integration of the heat exchange device 32 more complex.

According to a second embodiment described in document FR3077060, the heat exchanger is a coaxial heat exchanger positioned in the primary structure of the pylon. This solution makes it possible to free up the space occupied by the heat exchanger in the nacelle between the inner and outer walls of the nacelle. However, it makes the inner zone of the primary structure of the pylon, which is a very dense zone, more complex.

SUMMARY

The disclosure herein seeks to remedy all or some of the drawbacks of the prior art.

To that end, the disclosure herein relates to an aircraft propulsion assembly having an engine, a nacelle positioned around the engine, an annular duct delimited by the engine and the nacelle in which a bypass flow of cold air can flow, at least one bifurcation connecting the engine and the nacelle and having a leading edge and a primary structure of a pylon housed in the bifurcation and configured to connect the engine to an aircraft wing. The propulsion assembly has at least one heat exchange device comprising:
- a heat exchanger which has a first hot air circuit connecting a first inlet and a first outlet, and a second cold air circuit connecting a second inlet and a second outlet,
- a hot air supply duct connected to the first inlet and configured to take hot air from the engine,
- a hot air outlet duct connected to the first outlet and configured to convey hot air towards at least one item of aircraft equipment,
- a cold air supply duct connected to the second inlet and configured to take cold air from the bypass flow,
- an exhaust duct connected to the second outlet and configured to expel the air out of the aircraft.

According to the disclosure herein, the heat exchanger is a plate heat exchanger, having a hexagonal longitudinal section and positioned in the bifurcation.

Providing a heat exchanger with a hexagonal longitudinal section makes it possible to obtain a more compact heat exchange device and to be able to position it in the bifurcation.

According to another feature, the heat exchanger comprises plates positioned in vertical longitudinal planes.

According to another feature, the cold air supply duct has at least one opening configured to take cold air from the bypass flow and positioned in the leading edge of the bifurcation.

According to another feature, the opening is positioned approximately in the middle of the annular duct.

According to another feature, the cold air supply duct comprises first and second portions, the first portion having a first end connected to the opening and a second end, the second portion having a first end connected to the second inlet of the heat exchanger and a second end, the second ends of the first and second portions being fitted one inside the other and being able to slide with respect to one another.

According to another feature, the heat exchanger comprises mutually parallel upper and lower lateral faces, mutually parallel right-hand and left-hand lateral faces perpendicular to the upper and lower lateral faces, first upper and lower end faces perpendicular to the right-hand and left-hand lateral faces, and second upper and lower end faces perpendicular to the right-hand and left-hand lateral faces; the first and second upper end faces being adjacent to the upper lateral face and positioned on either side of the upper lateral face, the first and second lower end faces being adjacent to the lower lateral face and positioned on either side of the lower lateral face.

According to another feature, the first upper and lower end faces form an angle of between 6° and 150° between them, the second upper and lower end faces forming an angle of between 6° and 150° between them.

According to another feature, the first inlet is positioned on the second lower end face, the first outlet is positioned on the first upper end face, the second inlet is positioned on the first lower end face and the second outlet is positioned on the second upper end face.

According to another feature, the lower lateral face of the heat exchanger is pressed against the primary structure.

According to another feature, the heat exchanger is a countercurrent heat exchanger.

The disclosure herein also relates to an aircraft comprising at least one propulsion assembly according to one of the above features.

BRIEF DESCRIPTION OF THE DRAWINGS

Other features and advantages will become apparent from the following description of the disclosure herein, which description is given solely by way of example, with reference to the appended drawings in which:

FIGS. 4 and 5 show a propulsion assembly 60 which comprises:

Figure 1:
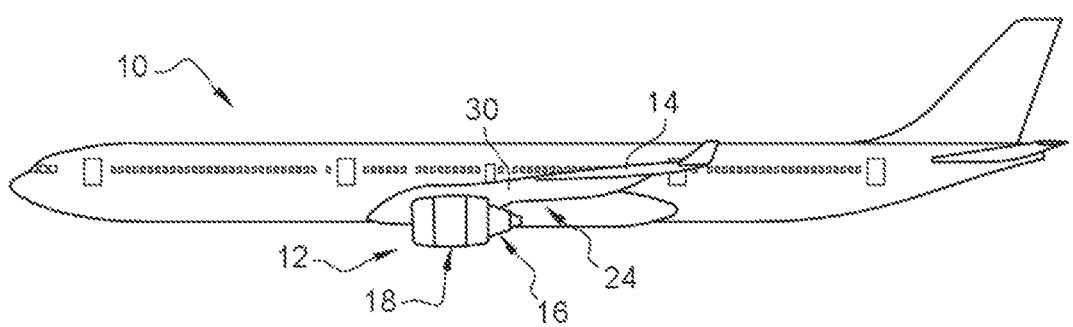
FIG. 1 is a side view of an aircraft.
Figure 2:
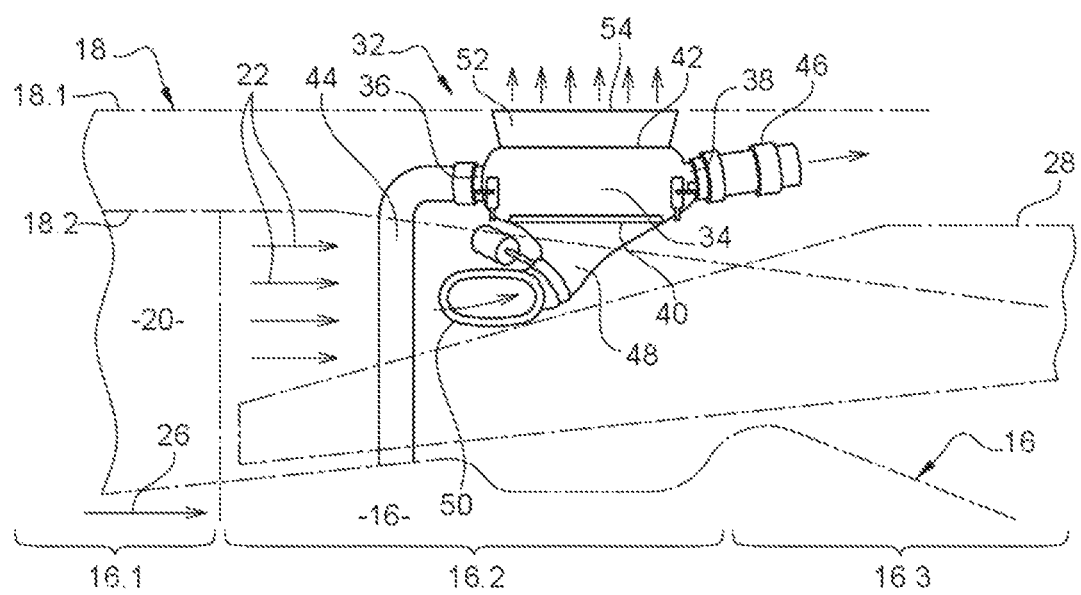
FIG. 2 is a schematic representation of a heat exchange device, illustrating an embodiment of the prior art.
Figure 3:
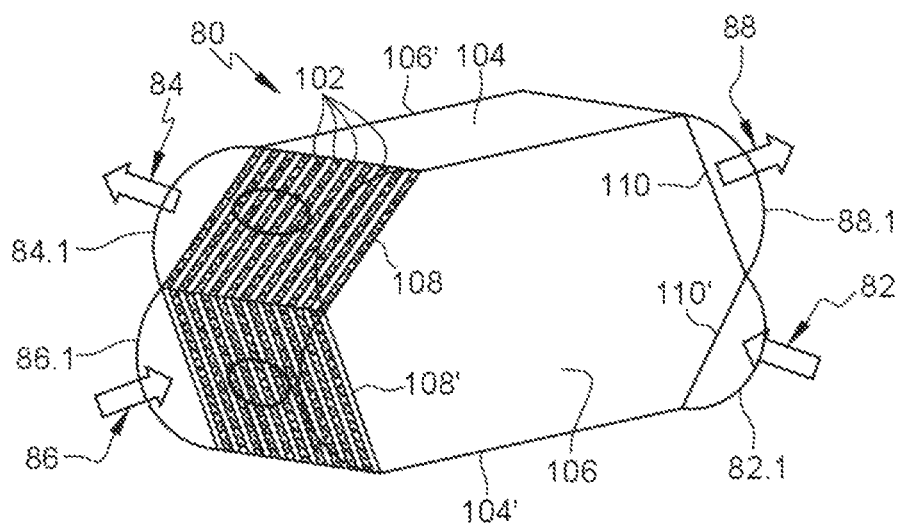
FIG. 3 is a perspective view of a plate heat exchanger, illustrating an embodiment of the disclosure herein.
Figure 4:
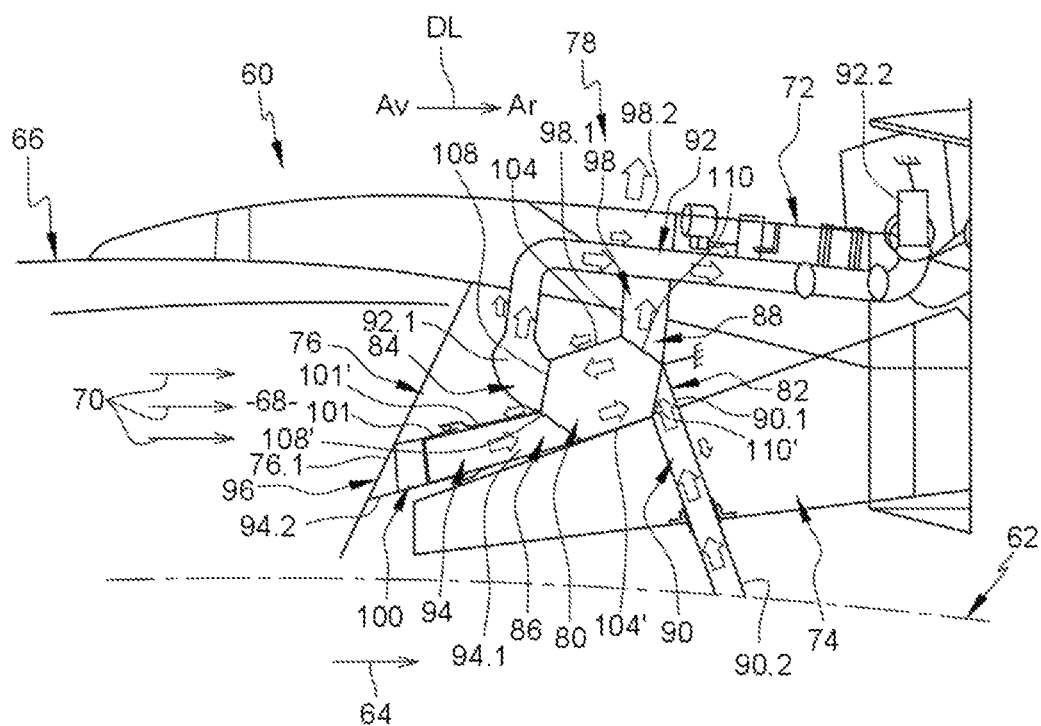
FIG. 4 is a schematic representation of a heat exchange device, illustrating an embodiment of the disclosure herein.

an engine 62 having a zone referred to as "core" zone in aeronautical jargon, in which flows a core flow of air 64, a nacelle 66 positioned around the engine 62 so as to delimit, with the latter, an annular duct 68 in which flows a bypass flow 70 of cold air, and a pylon 72 which provides the connection between the engine 62 and a wing of an aircraft.

DETAILED DESCRIPTION

For the remainder of the description, a longitudinal direction DL is parallel to the axis of rotation of the engine 62. A longitudinal plane contains a longitudinal direction.

The terms front/rear (Av/Ar) refer to the direction of flow of the flow of bypass air 70, which flows from front to rear. A vertical direction corresponds to a vertical plane when the aircraft is on the ground.

The pylon 72 comprises a rigid primary structure 74 which, among other things, serves to transmit forces between the engine 62 and the rest of the aircraft, and a secondary structure which encloses the primary structure 74 on the outside of the nacelle 66 and reduces the drag of the pylon 72.

The propulsion assembly 60 comprises a bifurcation 76 (visible in FIG. 5) passing through the annular duct 68, connecting the engine 62 and the nacelle 66 in which the primary structure 74 of the pylon is positioned. This bifurcation 76 has an aerodynamic fairing enclosing the primary structure 74 in the bypass flow 70 in order to reduce disruptions to the bypass flow 70.

Each bifurcation 76 comprises a leading edge 76.1 which corresponds to the bifurcation zone that is located furthest to the front and that is configured to separate the bypass flow 70 into two flows flowing on either side of the bifurcation 76. A first bifurcation 76 is positioned in a substantially vertical plane above the engine 62.

A more detailed description of all these elements of the propulsion assembly is not given, since they can be identical to those of the prior art.

At least one propulsion assembly 60 comprises at least one heat exchange device 78 configured to cool hot air which is taken from the compression stages of the engine 62 and is destined for the systems for air-conditioning and pressurization of the aircraft, for de-icing of the wing and/or for any other system of the aircraft.

According to a first embodiment, each heat exchange device 78 comprises:

a heat exchanger 80 which has a first hot air circuit connecting a first inlet 82 and a first outlet 84, and a second cold air circuit connecting a second inlet 86 and a second outlet 88, a hot air supply duct 90 which has a first end 90.1 connected to the first inlet 82 and a second end 90.2 configured to take hot air from the engine 62, a hot air outlet duct 92 which has a first end 92.1 connected to the first outlet 84 and a second end 92.2 configured to convey hot air towards at least one item of aircraft equipment, a cold air supply duct 94 which has a first end 94.1 connected to the second inlet 86 and a second end 94.2 having at least one opening 96 configured to take cold air from the bypass flow 70, and an exhaust duct 98 which has a first end 98.1 connected to the second outlet 88 and a second end 98.2 configured to expel the air out of the aircraft.

The first and second circuits of the heat exchanger 80 are configured to exchange heat between the hot air flowing in the first circuit and the cold air flowing in the second circuit.

The first, hot air supply duct 90 passes through the primary structure 74 of the pylon 72.

Figure 5:
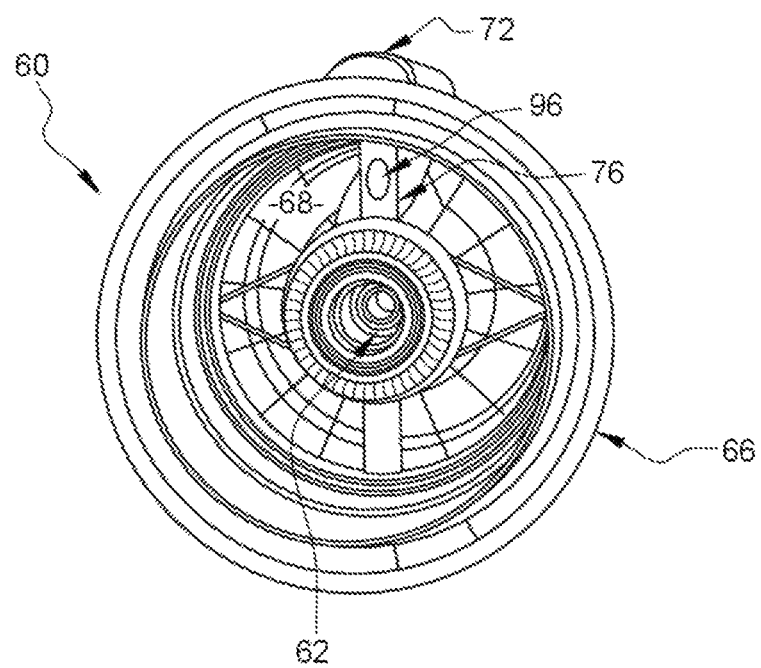
FIG. 5 is a front view of a propulsion assembly for an aircraft, illustrating an embodiment of the disclosure herein.

According to one feature, the opening 96 in the cold air supply duct 94 is positioned in the leading edge 76.1 of the first bifurcation 76 positioned in a substantially vertical plane above the engine 62. As illustrated in FIG. 5, the opening 96 is positioned approximately equidistant from the engine 62 and from the nacelle 66, in the middle of the annular duct 68.

Positioning the opening 96 in the leading edge 76.1 of the bifurcation 76 promotes the introduction of air into the cold air supply duct 94 and reduces the disruptions to the bypass flow 70 that are caused by the heat exchange device 78.

According to one configuration, the cold air supply duct 94 comprises a valve 100 configured to regulate the flow of cold air transferred to the heat exchanger 80.

According to one configuration, the cold air supply duct 94 comprises first and second portions 101 and 101', the first portion 101 having a first end connected to the opening 96 and a second end, the second portion 101' having a first end connected to the second inlet 86 of the heat exchanger 80 and a second end, the second ends of the first and second portions 101, 101' being fitted one inside the other and being able to slide with respect to one another. A seal is interposed between the second ends of the first and second portions 101, 101'.

According to one feature, the heat exchanger 80 is a plate heat exchanger having a plurality of mutually parallel, spaced-apart plates 102 separating the hot air and the cold air, the hot air and the cold air flowing in alternation between the plates 102. The heat exchanger 80 comprises a first circuit, in which the hot air flows, comprising first zones between plates, and a second circuit, in which the cold air flows, comprising second zones between plates that are interposed between the first zones between plates. Thus, the hot air flows between the first and second plates, between the third and fourth plates, between the fifth and sixth plates and so on, while the cold air flows between the second and third plates, between the fourth and fifth plates, between the sixth and seventh plates, and so on.

According to one configuration, the first and second circuits of the heat exchanger 80 are arranged so as to obtain a countercurrent heat exchanger, the hot air and the cold air circulating in parallel on either side of the plates 102 but in opposite directions, in particular in the central part of the heat exchanger 80. This configuration makes it possible to obtain a more effective heat exchanger for a given size.

The heat exchanger 80 comprises a first feeder 82.1 configured to place the first inlet 82 in communication with the first zones between plates, a first manifold 84.1 configured to place the first zones between plates in communication with the first outlet 84, a second feeder 86.1 configured to place the second inlet 86 in communication with the second zones between plates, and a second manifold 88.1 configured to place the second zones between plates in communication with the second outlet 88.

The plates 102 of the heat exchanger 80 are positioned in vertical longitudinal planes.

The heat exchanger 80 has four lateral faces, parallel in pairs, specifically an upper lateral face 104, a lower lateral face 104' parallel to the upper lateral face 104, a right-hand lateral face 106, and a left-hand lateral face 106' parallel to the right-hand lateral face 106.

The upper and lower lateral faces 104, 104' are perpendicular to the right-hand and left-hand lateral faces 106, 106'. Thus, the heat exchanger 80 has a square or rectangular cross section in transverse planes (perpendicular to the lateral faces 104, 104', 106, 106').

According to one feature of the disclosure herein, the heat exchanger 80 has a hexagonal longitudinal section in longitudinal planes parallel to the plates 102. The heat exchanger 80 thus has, at a first end, a first upper end face 108 and a first lower end face 108', and, at a second end, a second upper end face 110 and a second lower end face 110'.

The first and second upper end faces 108, 110 are adjacent to the upper lateral face 104 and positioned on either side of the upper lateral face 104. The first and second lower end faces 108', 110' are adjacent to the lower lateral face 104' and positioned on either side of the lower lateral face 104'.

The first and second upper and lower end faces 108, 108', 110, 110' are substantially perpendicular to the right-hand and left-hand lateral faces 106, 106'.

The first upper and lower end faces 108, 108' form an angle of between 60° and 150° between them. In parallel, the second upper and lower end faces 110, 110' form an angle of between 60° and 150° between them.

According to one configuration, the first inlet 82 and the first feeder 82.1 are positioned on the second lower end face 110', the first outlet 84 and the first manifold 84.1 are positioned on the first upper end face 108, the second inlet 86 and the second feeder 86.1 are positioned on the first lower end face 108', the second outlet 88 and the second manifold 88.1 are positioned on the second upper end face 110.

Providing a heat exchanger with a hexagonal longitudinal section makes it possible to obtain a more compact heat exchange device 78. Thus, by contrast to the prior art, the cold air supply duct 94 and the hot air supply duct 92 do not form an angle of approximately 90° but of less than 90°, about 60°, at the outlet of the heat exchanger 80. Similarly, the hot air supply duct 90 and the exhaust duct 98 do not form an angle of approximately 90° but of less than 90°, about 60°, at the outlet of the heat exchanger 80. The upper, lower, right-hand and left-hand lateral faces 104, 104', 106, 106' are thus clear.

By virtue of this compactness, the heat exchanger 80 is positioned in the first bifurcation 76, its lower lateral face 104' being pressed against the primary structure 74.

This arrangement makes it possible to not further encumber the interior of the primary structure and the zone located between the exterior and interior ducts of the nacelle 66, above the annular duct.

While at least one example embodiment of the invention (s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and 10 in any order unless the disclosure or context suggests otherwise. This disclosure hereby incorporates by reference the complete disclosure of any patent or application from which it claims benefit or priority.

The invention claimed is:

1. An aircraft propulsion assembly comprising:
 an engine;
 a nacelle positioned around the engine;
 an annular duct, which is defined by the engine and the nacelle, in which a bypass flow of cold air can flow;
 at least one bifurcation connecting the engine and the nacelle, wherein the at least one bifurcation has:
  a leading edge; and
  a primary structure of a pylon housed in the at least one bifurcation, wherein the pylon is configured to connect the engine to an aircraft wing; and
 at least one heat exchange device, which comprises:
  a heat exchanger comprising a first hot air circuit connecting a first inlet and a first outlet, and comprising a second cold air circuit connecting a second inlet and a second outlet;
  a hot air supply duct connected to the first inlet and configured to take hot air from the engine;
  a hot air outlet duct connected to the first outlet and configured to convey hot air towards at least one item of aircraft equipment;
  a cold air supply duct connected to the second inlet and configured to take cold air from the bypass flow; and an exhaust duct connected to the second outlet and configured to expel the air out of the aircraft;

wherein the heat exchanger is a plate heat exchanger, having a hexagonal longitudinal section and positioned in the bifurcation.

2. The propulsion assembly according to claim 1, wherein the heat exchanger comprises plates positioned in vertical longitudinal planes.

3. The propulsion assembly according to claim 1, wherein the cold air supply duct has at least one opening configured to take the cold air from the bypass flow, wherein the at least one opening is positioned in the leading edge of the bifurcation.

4. The propulsion assembly according to claim 3, wherein the at least one opening is positioned approximately in a middle of the annular duct.

5. The propulsion assembly according to claim 3, wherein the cold air supply duct comprises:
   a first portion having a first end, which is connected to the at least one opening, and a second end; and
   a second portion having a first end, which is connected to the second inlet of the heat exchanger, and a second end;
   wherein the second end of the first portion and the second end of the second portion are fitted one inside another and are able to slide with respect to one another.

6. The propulsion assembly according to claim 1, wherein the heat exchanger comprises:
   mutually parallel upper and lower lateral faces;
   mutually parallel right-hand and left-hand lateral faces perpendicular to the upper and lower lateral faces;
   first upper and lower end faces perpendicular to the right-hand and left-hand lateral faces; and
   second upper and lower end faces perpendicular to the right-hand and left-hand lateral faces;
   wherein the first and second upper end faces are adjacent to the upper lateral face and positioned on either side of the upper lateral face; and
   the first and second lower end faces are adjacent to the lower lateral face and positioned on either side of the lower lateral face.

7. The propulsion assembly according to claim 6, wherein:
   the first inlet is positioned on the second lower end face;
   the first outlet is positioned on the first upper end face;
   the second inlet is positioned on the first lower end face; and
   the second outlet is positioned on the second upper end face.

8. The propulsion assembly according to claim 1, wherein:
   the first upper and lower end faces form an angle of between 60° and 150°; and
   the second upper and lower end faces form an angle of between 60° and 150°.

9. The propulsion assembly according to claim 8, wherein:
   the first inlet is positioned on the second lower end face;
   the first outlet is positioned on the first upper end face;
   the second inlet is positioned on the first lower end face; and
   the second outlet is positioned on the second upper end face.

10. The propulsion assembly according to claim 6, wherein the lower lateral face of the heat exchanger is pressed against the primary structure.

11. The propulsion assembly according to claim 1, wherein the heat exchanger is a countercurrent heat exchanger.

12. An aircraft comprising at least one propulsion assembly according to claim 1.

* * * * *